United States Patent [19]
Woerner et al.

[11] Patent Number: 6,039,640
[45] Date of Patent: Mar. 21, 2000

[54] ECCENTRIC GRINDER LOADING SYSTEM

[75] Inventors: Klaus D. Woerner, Cambridge; Allen Sommers, Waterloo, both of Canada

[73] Assignee: ATS Automation Tooling Systems Inc., Cambridge, Canada

[21] Appl. No.: 08/969,569

[22] Filed: Nov. 13, 1997

Related U.S. Application Data

[60] Provisional application No. 60/030,477, Nov. 13, 1996.

[51] Int. Cl.$^7$ ..................................................... B24B 19/00
[52] U.S. Cl. .................................. 451/460; 451/9; 451/10
[58] Field of Search .............................. 451/460, 7, 9–10, 451/337, 336

[56] References Cited

U.S. PATENT DOCUMENTS

| | | | |
|---|---|---|---|
| 1,336,928 | 4/1920 | Simmons | 451/460 |
| 3,660,949 | 5/1972 | Coes, Jr. . | |
| 3,812,629 | 5/1974 | Campbell . | |
| 4,207,710 | 6/1980 | Fournier . | |
| 4,303,054 | 12/1981 | Lore . | |
| 4,918,868 | 4/1990 | Barth et al. . | |
| 5,070,655 | 12/1991 | Aggarwal | 451/10 |
| 5,167,095 | 12/1992 | Berger . | |
| 5,251,405 | 10/1993 | Clauss et al. . | |
| 5,392,566 | 2/1995 | Wedeniwski . | |
| 5,445,553 | 8/1995 | Cryer et al. | 451/7 |
| 5,453,040 | 9/1995 | Schaal et al. . | |
| 5,620,357 | 4/1997 | Misaka et al. | 451/9 |
| 5,630,747 | 5/1997 | Haller | 451/11 |
| 5,720,271 | 2/1998 | Hauser | 451/460 |
| 5,816,896 | 10/1998 | Schouwenaars | 451/10 |
| 5,839,424 | 11/1998 | Hauser | 451/460 |

*Primary Examiner*—David A. Scherbel
*Assistant Examiner*—Lee Wilson
*Attorney, Agent, or Firm*—R. Craig Armstrong

[57] ABSTRACT

The apparatus accurately and automatically orients a shaft with an eccentric end portion for positioning in an eccentric chuck. An unoriented shaft is deposited on a support assembly. The shaft is supported by the eccentric and adjacent the end remote from the eccentric. The shaft is rotated, preferably by a magnet, to orient the eccentric at a precise angular orientation. Preferably, a proximity sensor verifies that successful orientation has been achieved. Once the shaft is properly oriented, it is removed by a pick and place robot, for insertion into the chuck.

10 Claims, 6 Drawing Sheets

ECCENTRIC GRINDER LOADING SYSTEM

REFERENCE TO RELATED APPLICATION

This is a formal application based on a previously-filed provisional application, Ser. No. 60/030,477, filed Nov. 13, 1996.

BACKGROUND OF THE INVENTION

This invention relates to a method and apparatus for production of a shaft having an eccentric end portion.

Such shafts are used in anti-lock braking systems, for example, although their use is obviously not limited to that particular application. The invention relates to the production of such shafts for any desired application.

Conventionally, the eccentric may be produced entirely by grinding down from the main diameter of the shaft, i.e. the shaft is mounted in an eccentric chuck, and the eccentric is ground down to its finished condition.

A much more efficient initial metal removal process is turning in a lathe. However, to polish the surface of the eccentric and to get it to the final required tolerances, a grinding operation is still required, with a fine grinding wheel.

The problem in the prior art is that to do the final grind on the eccentric, which has already been turned, the shaft has to be properly oriented in the eccentric chuck, i.e. it must be installed with the axis of the eccentric of the shaft aligned with the axis of the eccentric chuck, so that the rotation is about the axis of the eccentric of the shaft. This is obviously essential, since any wobble during grinding due to the axis of the eccentric being misaligned with the chuck axis would produce a defective part. In the prior art, the orientation has tended to be done manually, i.e. by an operating manually aligning the shaft in the chuck. This obviously leads to high labor costs and low production rates, and also to relatively high error rates since accurate manual placement is inevitably somewhat inconsistent.

There is thus a need for a means of automatically orienting the shaft properly in the eccentric chuck.

SUMMARY OF THE INVENTION

It follows from the above that it is an object of the invention to provide a means for accurately and automatically orienting a shaft with an eccentric end portion in an eccentric chuck.

In the invention, this is accomplished by depositing the shaft on a support assembly. The shaft is supported by the eccentric and adjacent the end remote from the eccentric. The shaft is rotated to orient the eccentric at a precise angular orientation. Once the shaft is properly oriented, it can be transferred to the eccentric chuck, for example by a pick and place robot. The pick and place robot can maintain the orientation produced by the support assembly, or could vary it by a fixed number of degrees if desired for some reason.

In the preferred embodiment of the invention, any necessary rotation is achieved by a magnet which automatically orients the shaft with a high degree of precision, by acting on the imbalanced mass to produce a rotational moment, as will be explained in detail below.

In the preferred embodiment, the magnet is positioned beneath the shaft adjacent to the eccentric, such that the mass of the shaft adjacent the eccentric is pulled towards the magnet, resulting in a rotational moment to rotate the shaft into the an orientation with the eccentric uppermost.

Alternatively, the magnet could be positioned beneath the eccentric, such that the eccentric is pulled down to the bottom.

The magnet orients the shaft with surprising precision. However, it is preferable to use sensing means such as a distance measuring device, for example an analog proximity sensor or linear voltage displacement transducer, to verify that successful orientation has been achieved. If a signal from the sensing means indicates that successful orientation has not been achieved, then the part may be rejected automatically or an alarm may be triggered for manual removal, but preferably the part is agitated on the support one or more times to see if proper orientation can then be achieved, as will be explained in greater detail below. More complex sensing means could be employed, such as a vision system for example, if desired for some reason.

Instead of using a magnet, in a less preferable embodiment the rotation of the shaft could be achieved by any suitable mechanical means, such as rubber wheels acting on the supported shaft. In such an embodiment, the sensing means would have to provide feedback to the rotation means, to stop the rotation when the correct orientation was reached.

Yet another means would be to simply rely on gravity, although friction would interfere with reliable orienting, or if friction was minimized, the shaft would oscillate radially and the process would have to be delayed until the oscillations disappeared. With the use of a magnet, any oscillations damp to zero very quickly.

BRIEF DESCRIPTION OF THE DRAWINGS

The invention will now be described in detail, with reference to the accompanying drawings of the preferred embodiment byway of example only, in which.

DETAILED DESCRIPTION

Figure 1A:
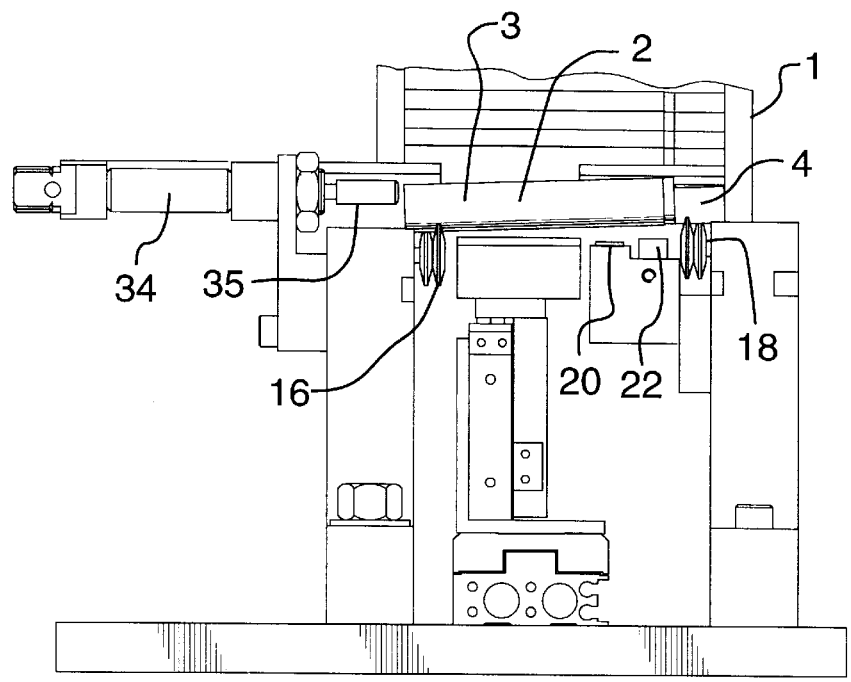
FIG. 1A is a front elevation view of the orienting portion of the apparatus, showing a shaft before orientation.

An operator fills a hopper assembly 1 with shafts 2, each shaft having a cylindrical body 3 with an eccentric 4 at one end. The operator must position the shafts with the eccentrics at the same end; the hopper is configured to prevent a shaft from advancing down the hopper if placed with the eccentric at the wrong end. The eccentric needs grinding down to its final diameter in an eccentric chuck (not illustrated) by a grinding wheel (also not illustrated). The invention orients the shafts properly for loading into the eccentric chuck.

As seen best in FIGS. 3–6, the shafts feed down from the hopper 1 by gravity to a pickup position 6 at the bottom of the hopper. A lifting mechanism 8 then operates to lift the shaft from the pickup position and carry it to a support assembly 10. The lifting mechanism has an x-motion block 12, and a z-motion lifter 14, operable to first lift the shaft from the pickup position, then move it into position above the support assembly. The support assembly has suitable means such as two discs 16 defining a body-supporting groove to support the body of the shaft adjacent its remote end, and suitable means such as two discs 18 defining an eccentric-supporting groove to support the eccentric. Obviously, the grooves or other forms of support could be created by any suitable means other than two discs. The lifting mechanism then lowers the shaft onto the discs and continues to move down, to leave the shaft supported solely by discs.

Figure 1B:
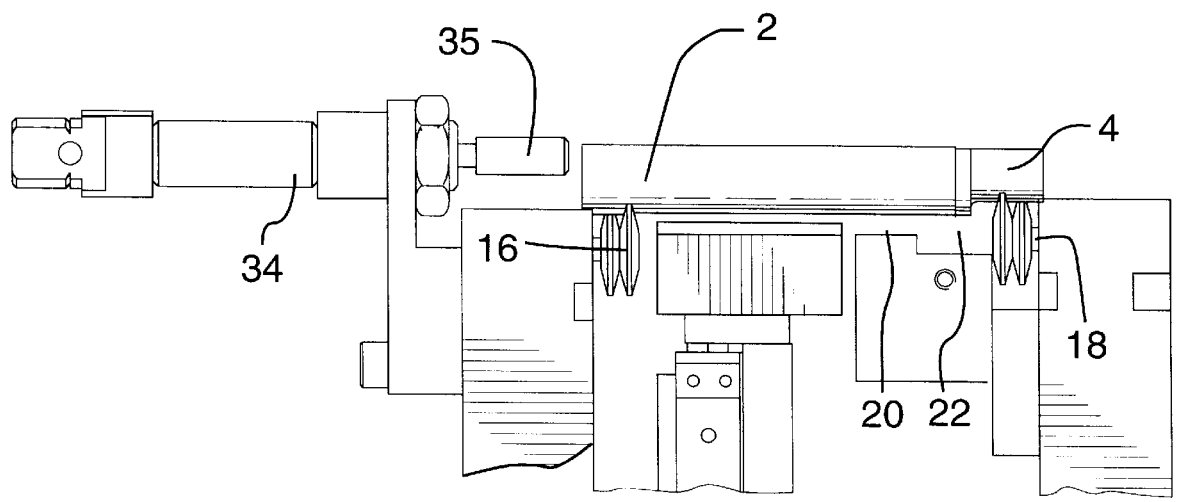
FIG. 1B is a front elevation view corresponding to FIG. 1A, but showing a shaft after orientation.
Figure 2A:
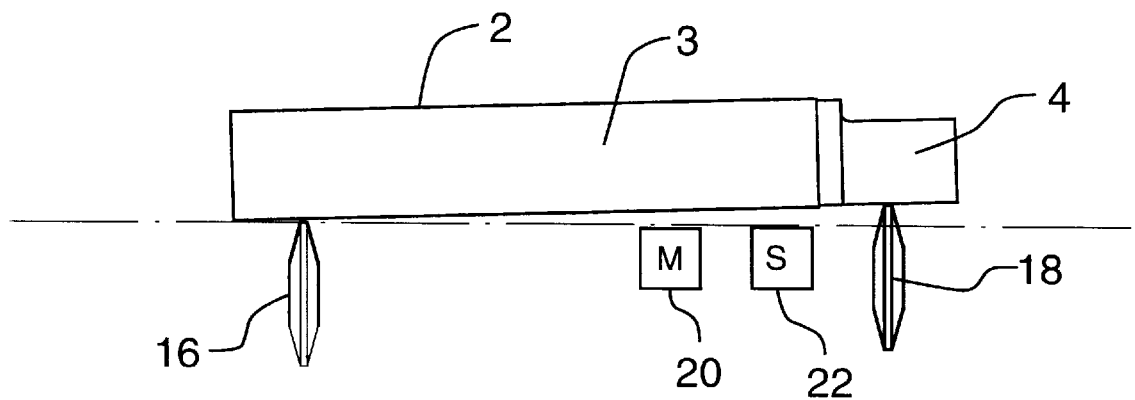
FIG. 2A is a schematic front elevation view corresponding to FIG. 1A.
Figure 2B:
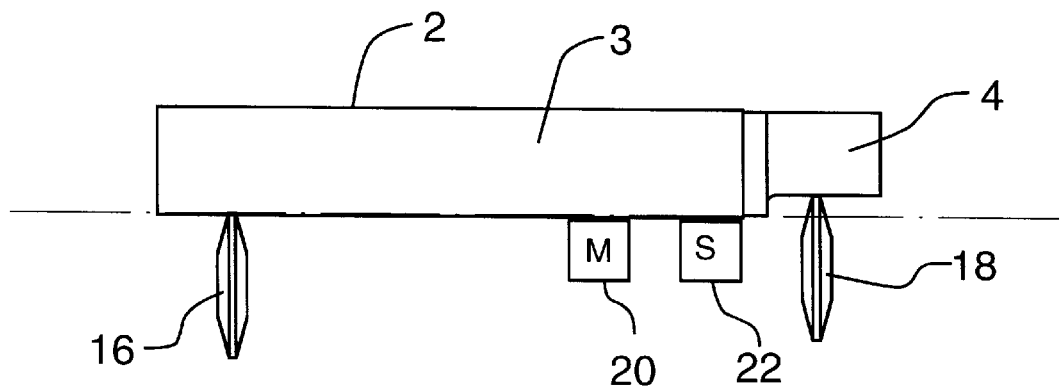
FIG. 2B is a schematic front elevation view corresponding to FIG. 1B.
Figure 3:
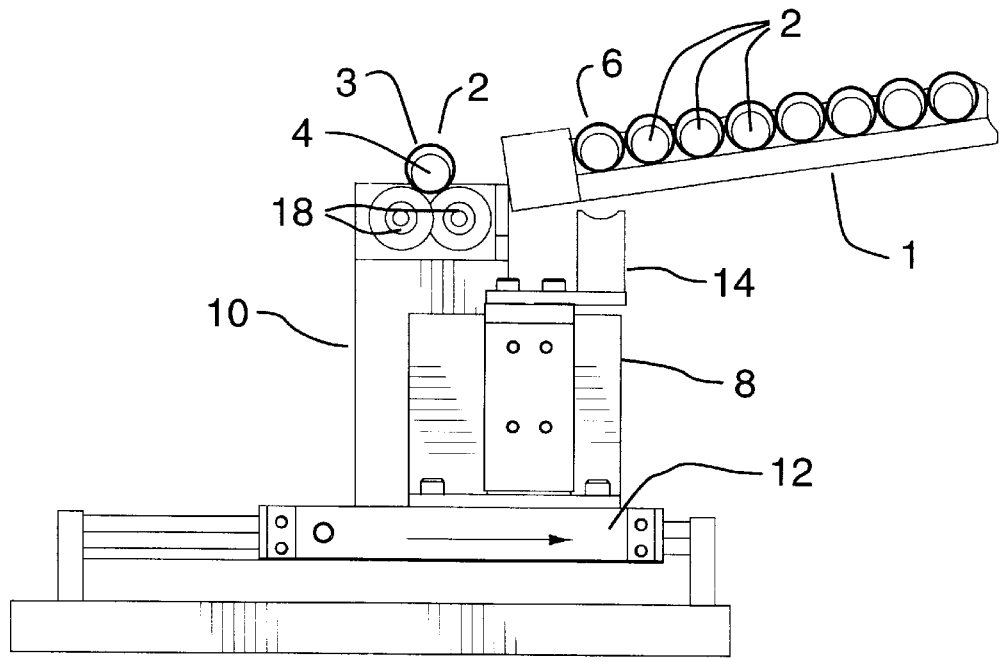
FIGS. 3–6 are side elevation views, showing the sequence of loading shafts onto the orienting portion.
Figure 4:
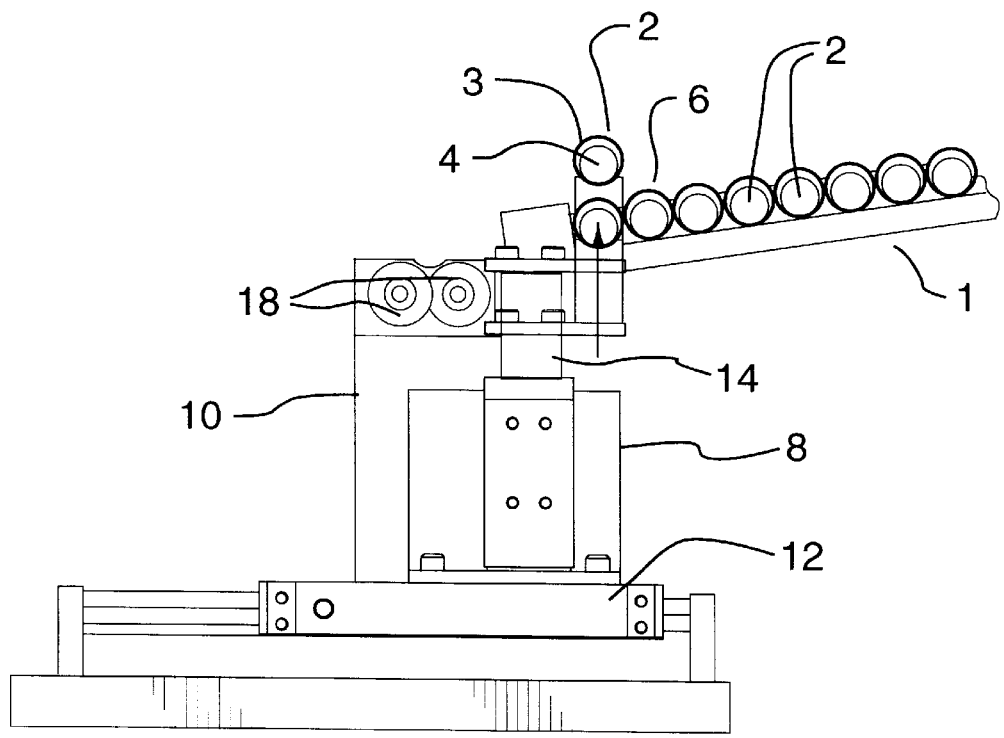
Figure 5:
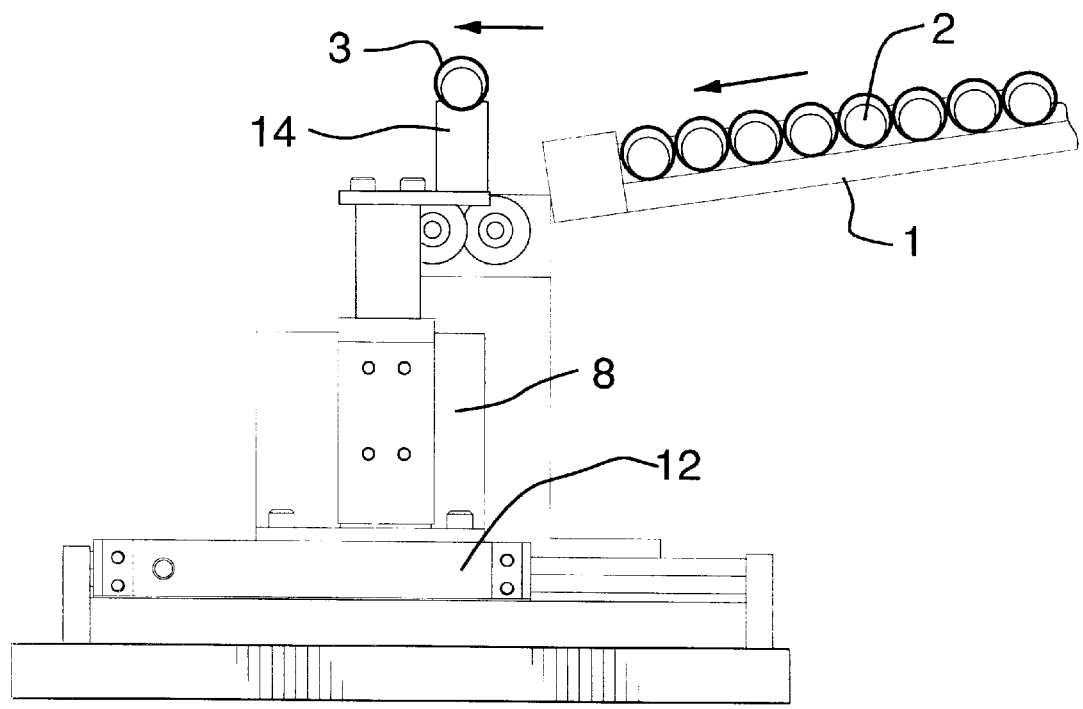
Figure 6:
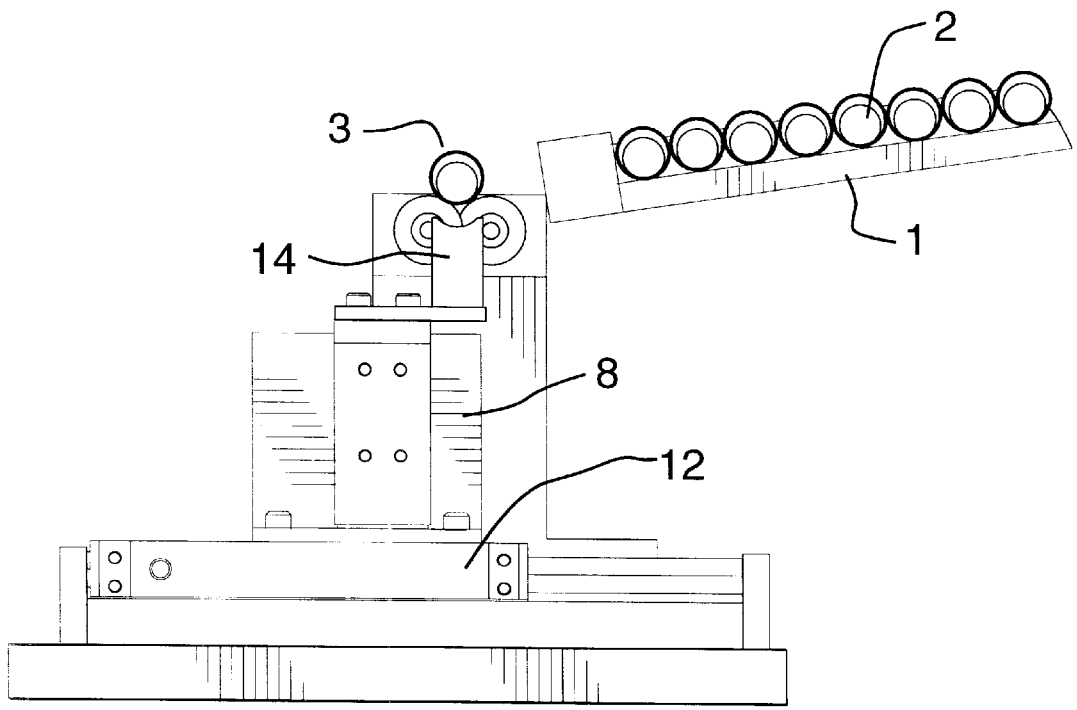
Figure 7:
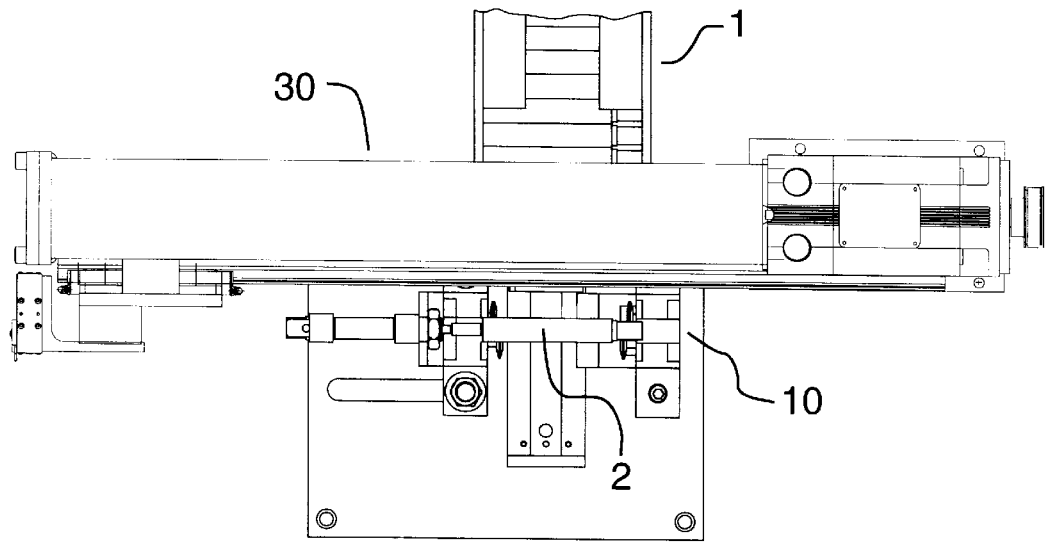
FIG. 7 is a top view of the overall apparatus.

In the preferred embodiment, a magnet 20 is positioned just below the body of the shaft near the eccentric, and next to the magnet is a distance measuring device, which in the preferred embodiment is an analog proximity sensor 22. When the shaft is not oriented correctly on the discs, the attractive force of the magnet automatically rotates the shaft such that the eccentric is positioned at the top, as illustrated in FIGS. 1 and 2 (before and after). In the preferred embodiment, the relative elevation of the disc pairs is set so that this rotation brings the shaft to a horizontal position. This facilitates transfer to the eccentric chuck, since no subsequent separate adjustment to a horizontal position is then necessary. However, such adjustment could be provided by the pick and place robot described below, although that would be an undesirable complication.

The analog proximity sensor 22 serves the purpose of detecting whether or not the magnet was successful in properly orienting the shaft. Occasionally, whether due to the eccentric being 180 degrees away from its proper position such that there is little or no moment to produce rotation of the shaft, or whether due to other causes, the shaft will not orient properly. When the shaft is properly oriented, the body will be at a minimum distance from the proximity sensor, whereas otherwise it will be at a greater distance. When at such a greater distance, the proximity sensor signal thus indicates a problem, and can be used to trigger operation of the lifting mechanism to lift the shaft and drop it back into place on the support. This agitation may be sufficient to allow the magnet to then properly orient the shaft. If the shaft is still not properly oriented, the agitation may be repeated one or more times. If the shaft is still not properly oriented, then an alarm may be triggered to call the operator for manual removal of the shaft (which is probably defective).

Figure 8:
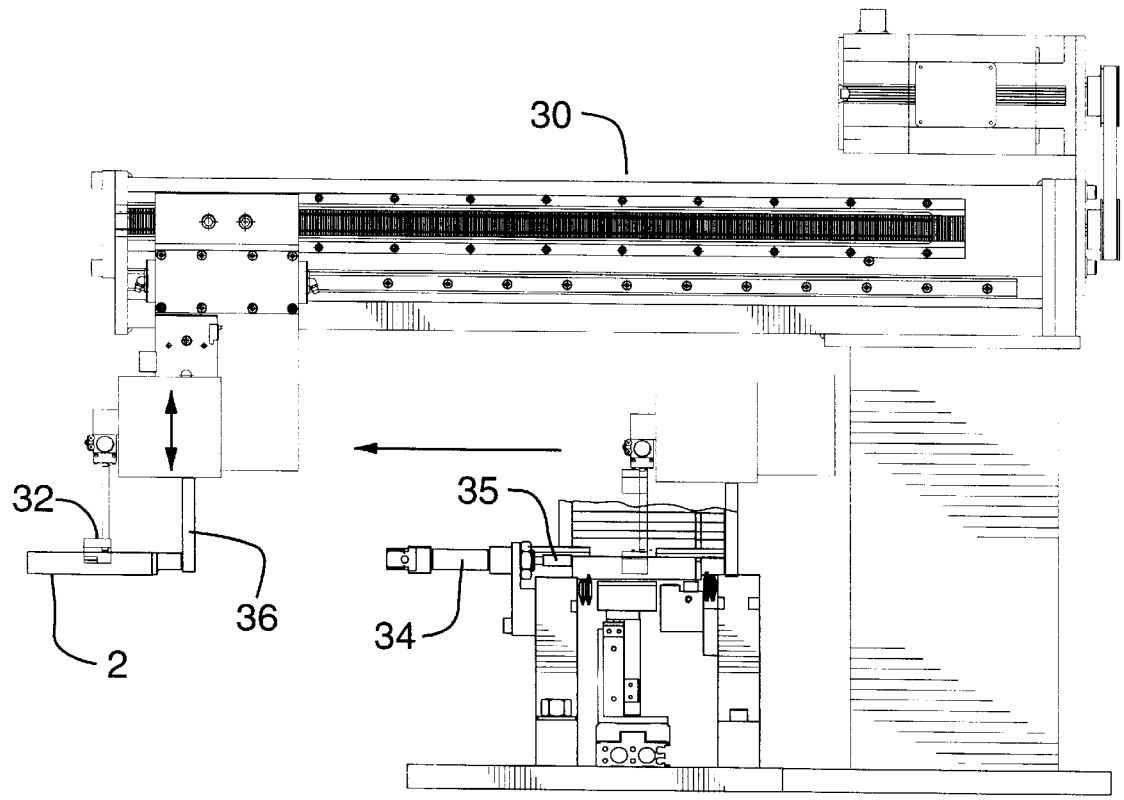
FIG. 8 is front elevation view corresponding to FIG. 7.
Figure 9:
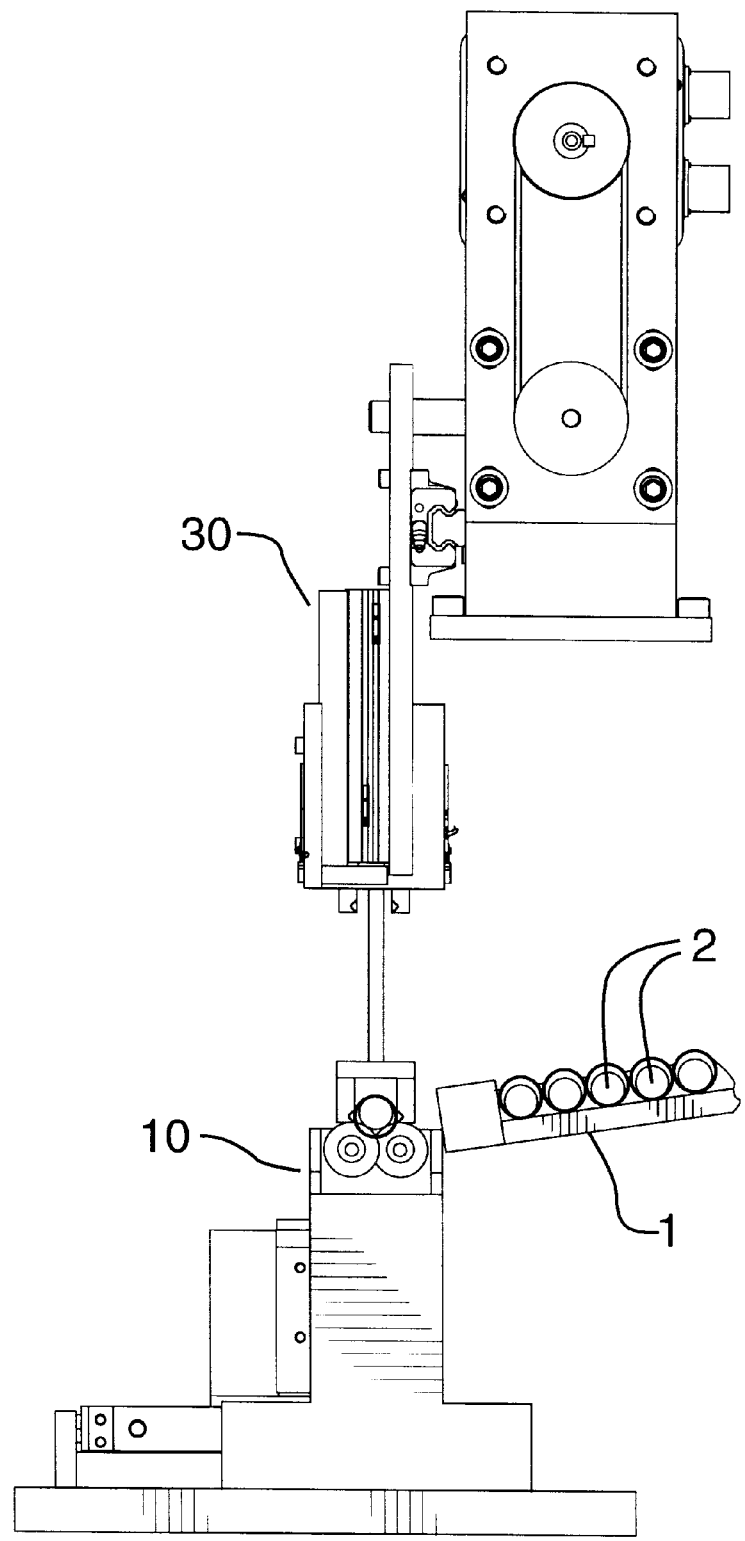
FIG. 9 is a side elevation corresponding to FIG. 7.

Once the shaft is properly oriented, a y- and z-motion pick and place robot 30 with a gripper mechanism 32 arrives to remove the shaft. With the gripper in place to grip the shaft, just before the gripper closes, the small cylinder 34 is actuated so that its end 35 nudges the shaft against a hard stop 36 embodied with the gripper, to ensure correct longitudinal positioning of the shaft for transfer to the eccentric chuck. The gripper then picks the shaft from the support and carries it to the eccentric chuck, which is not illustrated but is essentially at or near the end of the robot's travel, i.e. at the position of the shaft 2 shown in FIG. 8. The lifting mechanism then operates to position the next shaft on the discs so that it can be oriented. In the preferred embodiment, the pick and place robot simply maintains the orientation produced by the support assembly, but if desired, a pick and place unit which varies the orientation by a fixed or selected number of degrees could be used.

Prior to loading a shaft, the chuck is homed to ensure that it is correctly positioned and oriented to receive the shaft. The chuck closes on the shaft, the shaft is released by the pick and place robot, and grinding commences, the grinding being carried out by a grinding wheel which moves towards the chuck (or the chuck could be moved towards the grinding wheel). Meanwhile, the pick and place robot returns to the area of the support assembly to pick up the next oriented shaft.

When grinding is completed, the grinding wheel retracts, the chuck opens, and the next shaft is positioned in the chuck. In the preferred embodiment, the chuck has an open center and the completed shaft is pushed out through the open center by the new shaft, and exits at the opposite end of the chuck. Alternatively, although less economical, the completed shaft could be removed before the next shaft is loaded, for example by a second pick and place robot.

The main advantages of the invention are that significant labor cost reductions are achieved, and that better quality and consistency is obtained, with lower reject rates.

What is claimed as the invention is:

1. Apparatus for loading an eccentric shaft in an eccentric chuck, said eccentric shaft having a main body and an eccentric end portion, comprising:
    a feeder for presenting a plurality of said eccentric shafts to a pickup location one at a time;
    support means for supporting one of said eccentric shaft at said eccentric end portion and at said main body remote from said eccentric end portion;
    a lifting mechanism for carrying one of said eccentric shaft from said pickup location to said support means;
    distance measuring means positioned opposite said main body adjacent said eccentric end portion for detecting a distance of said main body from said distance measuring means, whereby one of said eccentric shaft may be oriented by rotation to a position where said distance is oriented at a distance wherein said distance is from the group consisting of minimum and maximum distances, thereby establishing the orientation of said eccentric end portion; and
    a robot for taking one of said eccentric shaft to said chuck from said support means once said main body is oriented.

2. Apparatus as recited in claim 1, further comprising a magnet positioned beneath said main body adjacent said eccentric end portion, whereby said main body is pulled downwardly by said magnet, thereby producing rotation of one of said eccentric shaft to an orientation where said main body is at a minimum distance from said distance measuring means, said distance measuring means also being positioned beneath said main body adjacent said eccentric end portion.

3. Apparatus as recited in claim 2, where said main body is substantially horizontal once one of said eccentric shaft is so rotated by said magnet.

4. Apparatus for loading an eccentric shaft in an eccentric chuck, said eccentric shaft having a main body and an eccentric end portion, comprising:
    a feeder for presenting a plurality of said eccentric shafts to a pickup location one at a time;
    support means for supporting one of said eccentric shaft at said eccentric end portion and at said main body remote from said eccentric end portion;
    a lifting mechanism for carrying one of said eccentric shaft from said pickup location to said support means;
    a magnet positioned beneath said main body adjacent said eccentric end portion, whereby said main body is pulled downwardly by said magnet, thereby producing rotation of one of said eccentric shaft to an orientation where said eccentric end portion is uppermost; and a robot for taking one of said eccentric shaft to said chuck from said support means once said shaft is so oriented by said magnet.

5. Apparatus as recited in claim 4, further comprising distance measuring means positioned opposite said main body adjacent said eccentric end portion for detecting when said main body is at a minimum distance from said distance measuring means.

6. Apparatus as recited in claim 5, where said main body is substantially horizontal once so rotated to said orientation where said eccentric end portion is uppermost.

7. Apparatus as recited in claim 4, where said main body is substantially horizontal once so rotated to said orientation where said eccentric end portion is uppermost.

8. A method of loading an eccentric shaft in an eccentric chuck, said eccentric shaft having a main body and an eccentric end portion, comprising the steps of:

a. using a lifting mechanism to carry an eccentric shaft from a pickup location at a feeder to support means:

b. supporting said eccentric end portion and said main body remote from said eccentric end portion, on said support means;

c. rotating said shaft on said support means to a position where the orientation of said eccentric end portion is known; and d. using a robot to then transport said eccentric shaft from said support means to said eccentric chuck.

9. A method as recited in claim 8, comprising the use of distance measuring means positioned opposite said main body adjacent said eccentric end portion for detecting the distance of said main body from said distance measuring means, whereby said orientation of said eccentric end portion is known when said main body is at a distance selected from the group consisting of minimum and maximum distances from said distance measuring means.

10. A method as recited in claim 8, comprising the use of a magnet positioned beneath said main body adjacent said eccentric end portion, thereby producing said rotation of said shaft on said support means to a position where said eccentric end portion is uppermost and therefore known.

* * * * *